United States Patent
Anderson et al.

(10) Patent No.: US 10,464,652 B2
(45) Date of Patent: Nov. 5, 2019

(54) RISER CONDUITS HAVING INNER TUBE EXTENSIONS FOR MARINE ENGINE EXHAUST SYSTEMS

(71) Applicant: Indmar Products Company Inc., Millington, TN (US)

(72) Inventors: Timothy G. Anderson, Brighton, TN (US); Timothy G. Maher, Drummonds, TN (US); Jason C. Stimmel, Eads, TN (US)

(73) Assignee: Indmar Products Company Inc., Millington, TN (US)

(*) Notice: Subject to any disclaimer, the term of this patent is extended or adjusted under 35 U.S.C. 154(b) by 97 days.

(21) Appl. No.: 15/877,909

(22) Filed: Jan. 23, 2018

(65) Prior Publication Data

US 2019/0225313 A1 Jul. 25, 2019

(51) Int. Cl.
*B63H 21/32* (2006.01)
*B63H 21/38* (2006.01)
(Continued)

(52) U.S. Cl.
CPC ........... *B63H 21/32* (2013.01); *B63H 21/383* (2013.01); *F01N 13/004* (2013.01); *F01N 13/10* (2013.01); *F01N 13/1855* (2013.01)

(58) Field of Classification Search
CPC ............. F01N 13/1816; F01N 13/1811; F01N 13/004; F01N 2590/02; F01N 13/005; F01N 13/10; F01N 13/12; F01N 13/00; F01N 13/141; F01N 13/1805; F01N 13/1827; F01N 13/1844; F01N 2260/024; F01N 2340/00; F01N 2530/02; F01N 2530/18; F01N 2530/22; F01N 3/043; F01N 3/046; F01N 3/08; F01N 3/10; F16L 27/11; F16L 39/00; F16L 21/05; F16L 23/02; F16L 23/08; F16L 23/12; F16L 27/1004; F16L 27/1021; F16L 27/103; F16L 39/005; B63H 20/245; B63H 21/32; B63H 20/001; Y02T 10/20
See application file for complete search history.

(56) References Cited

U.S. PATENT DOCUMENTS 5,109,668 A * 5/1992 Lindstedt ................ F01N 3/046
60/310
6,022,254 A * 2/2000 Neisen ................. B63H 20/245
181/243
(Continued)

*Primary Examiner* — Audrey K Bradley
*Assistant Examiner* — Anthony Ayala Delgago
(74) *Attorney, Agent, or Firm* — Wood, Herron & Evans, LLP

(57) ABSTRACT

An exhaust system for a marine exhaust system includes two riser conduits, each being connected to a Y-pipe at an outlet end. An inner tube of each riser conduit directs exhaust gases through a catalytic converter assembly and into the Y-pipe. An outer tube surrounds each inner tube to define a cooling liquid passage between the inner and outer tubes to direct cooling liquid into one of the inlets of the Y-pipe. A bellows couples one of the riser conduits to one of the inlets of the Y-pipe. Each bellows surrounds one of the inlets of the Y-pipe and one of the riser conduits. To minimize reversion, the inner tube of each of the riser conduits extends into one of the bellows further than the outer tube of the respective riser conduit.

18 Claims, 7 Drawing Sheets

(51) Int. Cl.
*F01N 13/18* (2010.01)
*F01N 13/10* (2010.01)
*F01N 13/00* (2010.01)

(56) References Cited

U.S. PATENT DOCUMENTS

| | | |
|---|---|---|
| 6,250,976 B1 | 6/2001 | Ozawa |
| 6,343,417 B1 | 2/2002 | Bonny et al. |
| 7,552,586 B1 | 6/2009 | White |
| 7,699,675 B1 * | 4/2010 | Powers ............... B63H 21/32 440/88 J |
| 7,803,026 B2 | 9/2010 | McKinney |
| 8,650,864 B2 | 2/2014 | Waggoner et al. |
| 8,899,029 B1 * | 12/2014 | Dreyer ............... B63H 21/383 440/88 J |
| 9,957,863 B2 | 5/2018 | Stimmel et al. |
| 2013/0062878 A1 * | 3/2013 | Nakayama ........... F01N 13/00 285/124.1 |
| 2014/0086804 A1 | 3/2014 | Gruenwald et al. |
| 2014/0216423 A1 | 8/2014 | Mitsubayashi et al. |
| 2017/0370258 A1 | 12/2017 | Stimmel et al. |

* cited by examiner

RISER CONDUITS HAVING INNER TUBE EXTENSIONS FOR MARINE ENGINE EXHAUST SYSTEMS

TECHNICAL FIELD

The present invention relates generally to exhaust systems for marine engines, and more particularly, to liquid-cooled marine engine exhaust systems.

BACKGROUND

Exhaust systems for marine engines generally include an exhaust manifold connected to the engine at each row (or "bank") of engine cylinders, and a corresponding exhaust conduit coupled to the exhaust manifold for directing exhaust gases from the manifold to an exhaust outlet. In conventional exhaust systems, the exhaust conduit includes a horizontally oriented catalytic converter assembly having a catalyst that removes harmful emissions from the exhaust gases before being expelled through the exhaust outlet.

Exhaust systems can experience extremely high temperatures during use. For example, the core temperature of a catalytic converter in a conventional exhaust system can reach upwards of 1,000 degrees Fahrenheit (° F.) or more. For safety purposes, the U.S. Coast Guard requires that exterior surface temperatures of marine engine exhaust systems be maintained below 200° F. Accordingly, components of conventional marine engine exhaust systems, including the catalytic converter assemblies, are often liquid-cooled to ensure safe and compliant operating temperatures.

Marine engines are susceptible to being damaged through the introduction of water through the exhaust system into the marine engine. One way through which water may enter a marine engine is through what is known in the industry as "reversion". Reversion is the reverse flow of exhaust gases during the time period in which both intake and exhaust valves of the marine engine are simultaneously open. Pulses in the exhaust system cause water to move backwards into the exhaust manifold. Reversion primarily occurs when the marine engine runs at idle speed or slightly above idle speed.

Water injected into a marine engine typically damages an exhaust valve thus preventing the cylinder with the damaged exhaust valve from correctly sealing. This damaged cylinder then causes water to be pulled into the marine engine through the damaged exhaust valve. The introduced water is distributed within the marine engine causing the ultimate failure of the marine engine.

One known type of marine engine exhaust system design that seeks to minimize reversion uses connected conduits from a pair of exhaust manifolds, one exhaust manifold being located on each side of the marine engine. Gas pulses from each conduit are combined and the combination subsequently combined with cooling water. This type of marine engine exhaust system seeks to combine pulses from both sides of the engine so that double the number of pulses are present when the marine engine runs at idle speed or slightly above idle speed. Unfortunately, the exhaust gases in such a system are extremely hot because water is not added until after the gases combine which increases backpressure on the marine engine.

Accordingly, there is a need for improvements to known marine engine exhaust systems to reduce reversion.

SUMMARY

According to an exemplary embodiment of the invention, an exhaust system for a marine exhaust system includes first and second exhaust manifolds and first and second riser conduits. The first riser conduit is coupled to the first exhaust manifold and the second riser conduit is coupled to the second exhaust manifold. The exhaust system further comprises a Y-pipe having first and second inlet legs and an outlet leg. Each of the first and second riser conduits comprises an inner tube that directs exhaust gases from one of the first and second exhaust manifolds through a catalytic converter assembly and into one of the first and second inlet legs of the Y-pipe. Each of the first and second riser conduits further comprising an outer tube surrounding the inner tube defining a cooling liquid passage between the inner and outer tubes.

The exhaust system further comprises first and second bellows, each of the bellows surrounding a portion of one of the first and second inlet legs of the Y-pipe and surrounding the outer tube of one of the riser conduits. The bellows couples one of the first and second riser conduits to one of the first and second inlet legs of the Y-pipe using clamps surrounding the bellows. In order to reduce reversion, the inner tube of each of the first and second riser conduits extends into one of the bellows further than the outer tube of the respective riser conduit.

According to another aspect of the invention, an exhaust system for a marine exhaust system comprises first and second exhaust manifolds and a Y-pipe having first and second inlet legs and an outlet leg. A first riser conduit coupled to the first exhaust manifold extends into the first inlet leg of the Y-pipe. A second riser conduit coupled to the second exhaust manifold extends into the second inlet leg of the Y-pipe. Each of the first and second riser conduits comprise an inner tube and an outer tube surrounding the inner tube defining a cooling liquid passage between the inner and outer tubes. The inner tube directs exhaust gases from one of the first and second exhaust manifolds through a catalytic converter assembly and into one of the first and second inlet legs of the Y-pipe.

The exhaust system for a marine exhaust system further comprises first and second bellows. Each of the bellows couples one of the first and second riser conduits to one of the first and second inlet legs of the Y-pipe. Each of the bellows surrounds a portion of one of the first and second inlet legs of the Y-pipe and surrounds the outer tube of one of the riser conduits. At least one clamp surrounds each of the bellows. In order to reduce reversion, the inner tube of each of the first and second riser conduits extends into one of the bellows further than the outer tube of the respective riser conduit.

According to another aspect of the invention, an exhaust system for a marine exhaust system comprises first and second riser conduits and a Y-pipe having first and second inlet legs and an outlet leg. Each of the first and second riser conduits comprises an inner tube and an outer tube surrounding the inner tube defining a cooling liquid passage between the inner and outer tubes. The inner tube directs exhaust gases from one of the first and second exhaust manifolds through a catalytic converter assembly and into one of the first and second inlet legs of the Y-pipe. The outer tube directs cooling liquid into one of the first and second inlet legs of the Y-pipe.

The exhaust system further comprises first and second bellows. Each of the bellows couples one of the first and second riser conduits to one of the first and second inlet legs of the Y-pipe. Each of the bellows surrounds a portion of one of the first and second inlet legs of the Y-pipe and surrounds the outer tube of one of the riser conduits. At least one clamp surrounds each of the bellows. To reduce reversion, the inner tube of each of the first and second riser conduits extends into one of the bellows further than the outer tube of the respective riser conduit.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The drawings, which are incorporated in and constitute a part of this specification, illustrate embodiments of the invention and, together with the general description given above and the detailed description given below, explain the embodiments of the invention.

DETAILED DESCRIPTION

Figure 1:
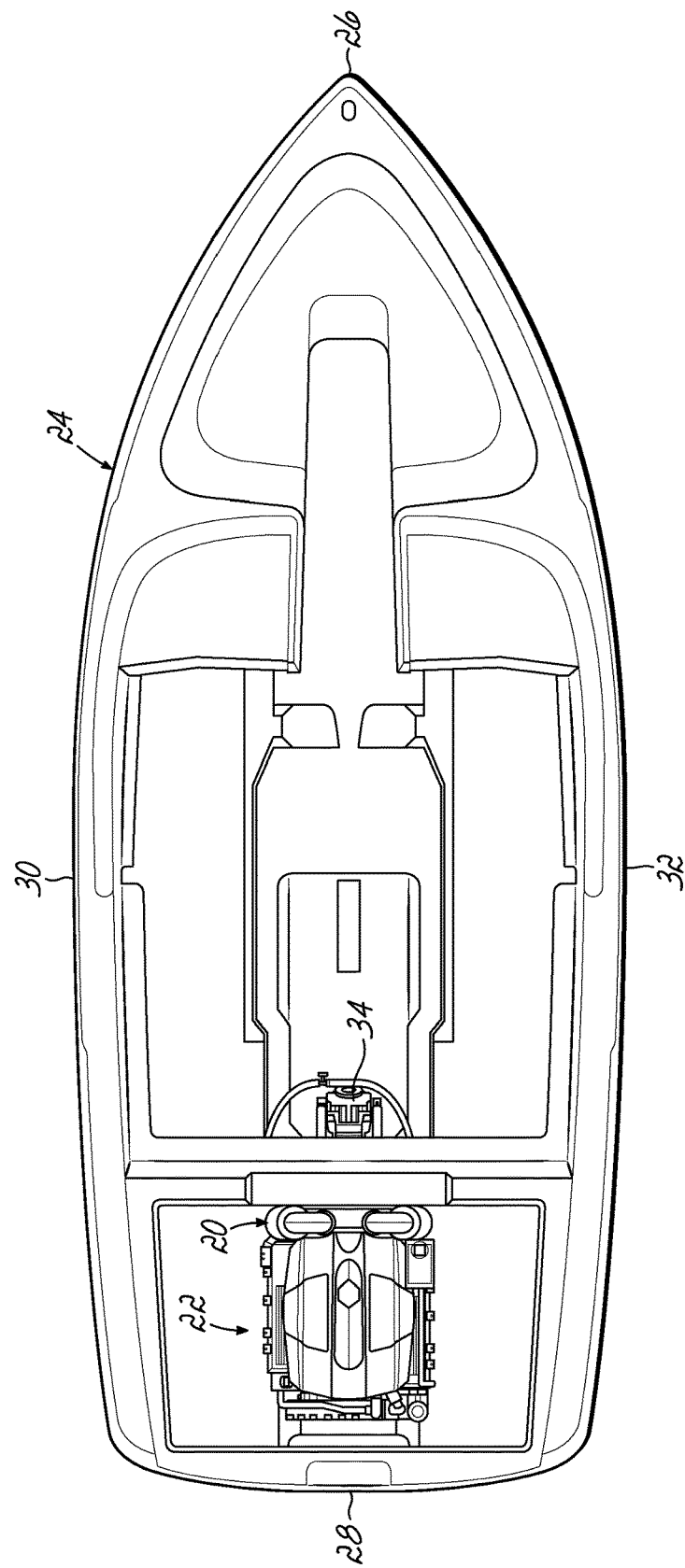
FIG. 1 is a top view of a motorboat including an inboard engine and an exhaust system coupled to the engine.

Referring to FIG. 1, an exhaust system 20, according to an exemplary embodiment of the invention, is shown mounted to a marine engine 22 within a motorboat 24. The motorboat 24 includes a bow 26, a stern 28, a port side 30, and a starboard side 32. The engine 22 is shown mounted in an "inboard" configuration and is coupled to a V-drive transmission 34 that drives a propeller shaft and propeller (not shown) to rotate, which propels the motorboat 24 through the water.

Figure 2:
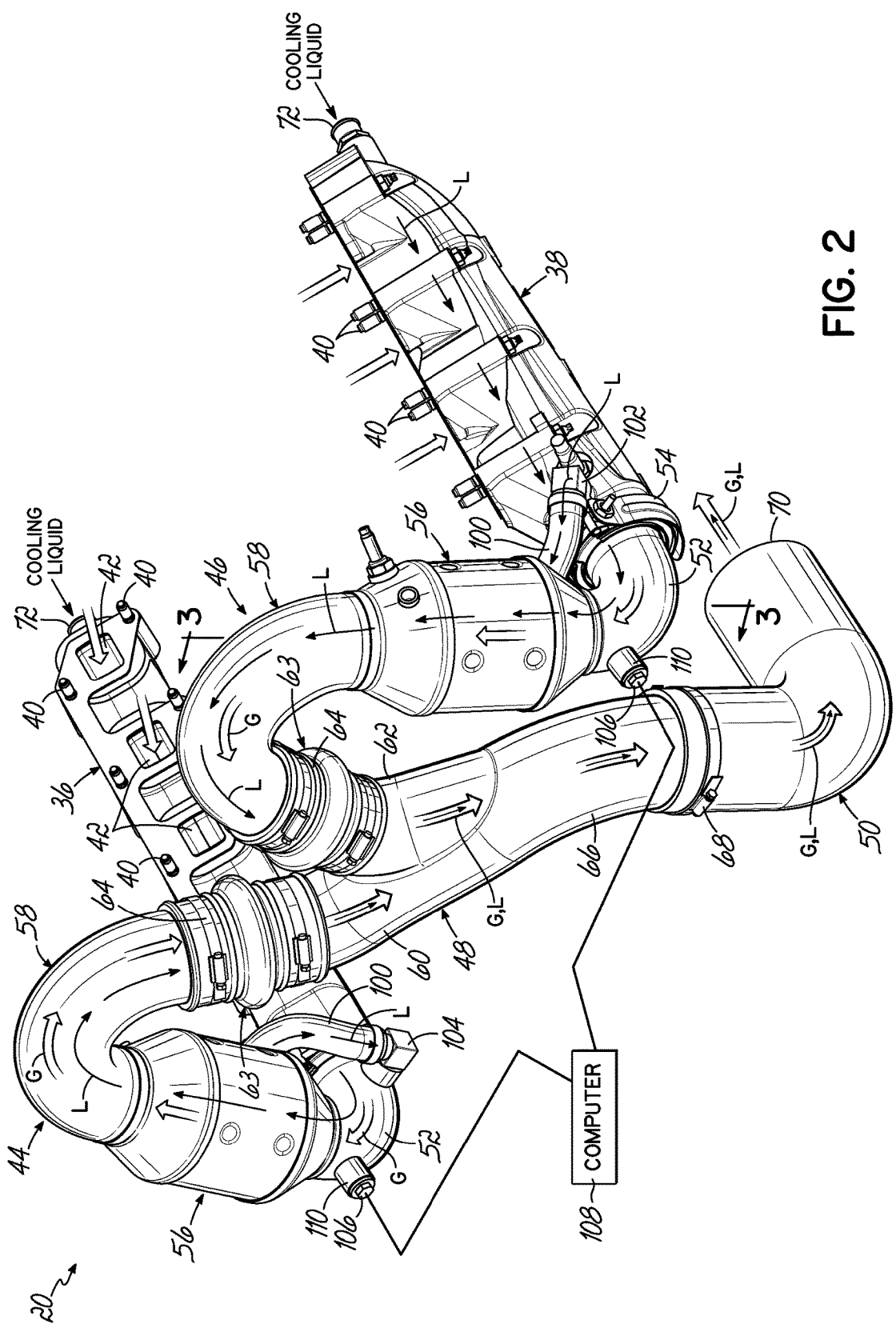
FIG. 2 is a perspective view of a marine engine exhaust system according to an exemplary embodiment of the invention.

Referring to FIG. 2, the exemplary exhaust system 20 is shown in greater detail, with the engine 22 being hidden from view. The exhaust system 20 generally includes a first exhaust manifold 36 that couples to a first bank of cylinders (not shown) of the engine 22 and a second exhaust manifold 38 that couples to a second bank of cylinders (not shown) of the engine 22 via threaded bolts 40. The engine 22 of FIG. 1 is shown in the form of a "V-8" engine, having two banks of four cylinders arranged in a known V-configuration. As such, each of the exhaust manifolds 36, 38 includes four exhaust inlet ports 42, each aligned with and receiving hot exhaust gases G expelled from a respective cylinder of the engine 22. In alternative embodiments, the exhaust manifolds 36, 38, as well as other components of the exemplary exhaust systems disclosed herein, may be modified as desired to accommodate marine engines 22 having various alternative quantities and configurations of cylinders.

The exhaust system 20 further includes first and second riser conduits 44, 46, a Y-pipe 48, and an exhaust outlet conduit 50. Each of the first and second riser conduits 44, 46 includes a lower riser section 52 defining an inlet end portion of the riser conduit 44, 46 coupled to a respective exhaust manifold 36, 38 with a clamp 54; a catalytic converter assembly 56 extending generally vertically from the lower riser section 52; and an upper riser section 58 extending upwardly from the catalytic converter assembly 56 and turning downwardly toward the Y-pipe 48 and defining an outlet end portion of the riser conduit 44, 46.

The Y-pipe 48 includes first and second inlet legs 60, 62 coupled to the first and second riser conduits 44, 46, respectively, with bellows 63. Each bellows 63 is secured in place surrounding an upper portion of one of the first and second inlet legs 60, 62 of the Y-pipe 48 with a clamped hose 64. Similarly, each bellows 63 is secured in place surrounding an outlet portion of one of the first and second riser conduits 44, 46, with another clamped hose 64.

As best shown in FIG. 2, the Y-pipe 48 further comprises an outlet leg 66 coupled to the exhaust outlet conduit 50 with a clamp 68. More specifically, the first inlet leg 60 couples to the outlet end of the upper riser section 58 of the first riser conduit 44, and the second inlet leg 62 couples to the outlet end of the upper riser section 58 of the second riser conduit 46.

Figure 3:
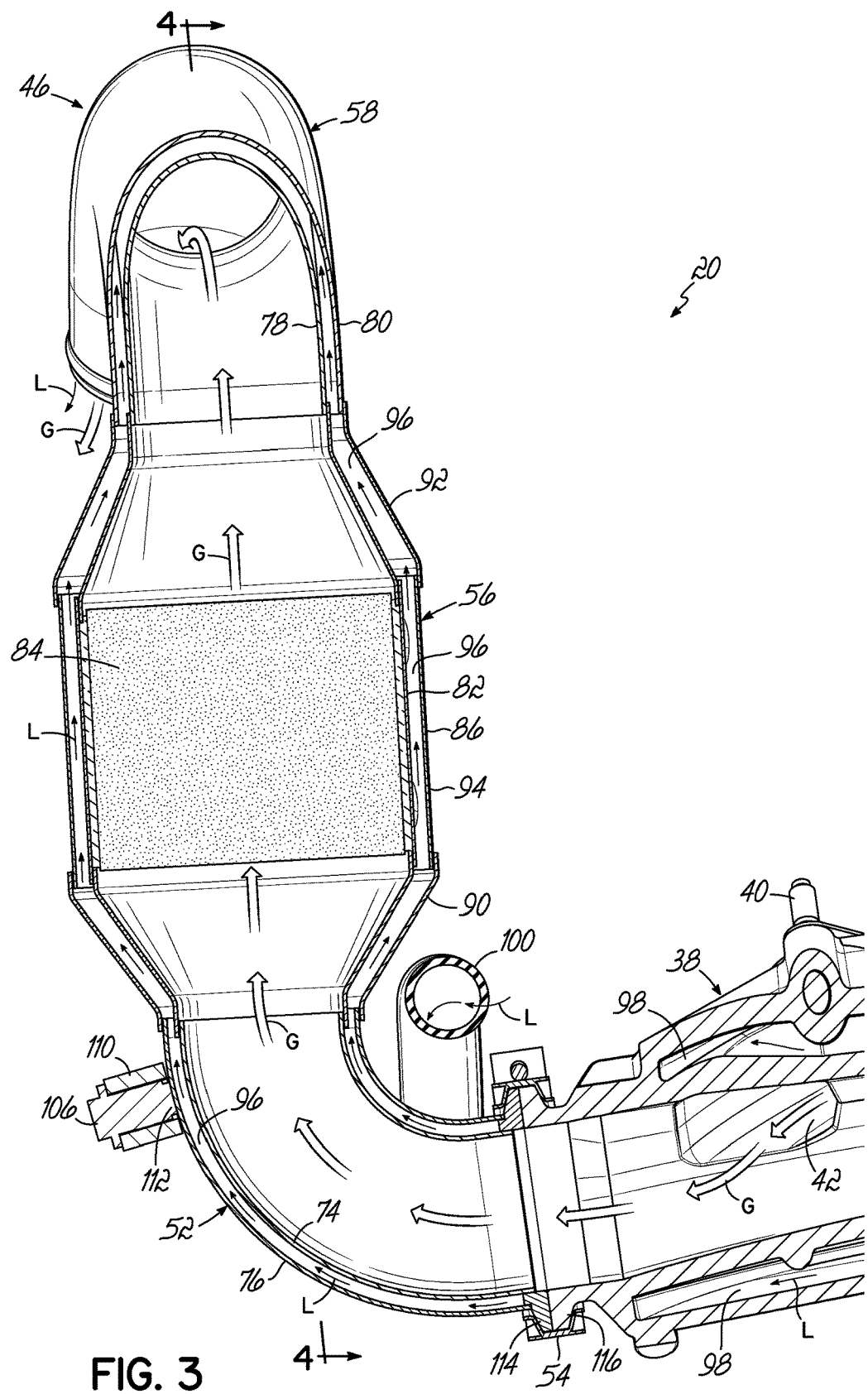
FIG. 3 is a side cross-sectional view taken along line 3-3 in FIG. 2, showing details of an exhaust conduit and an exhaust manifold of the exhaust system.
Figure 4:
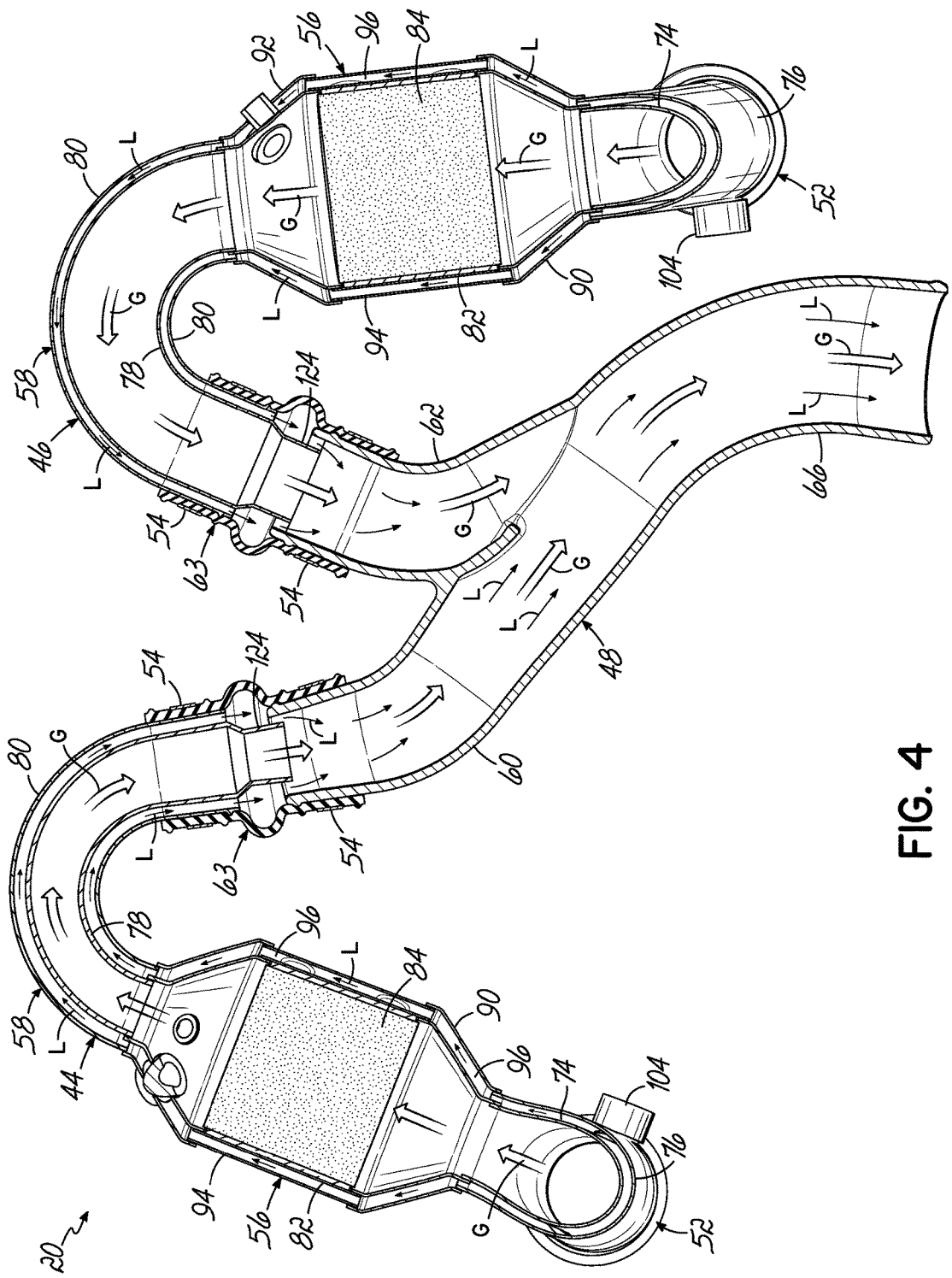
FIG. 4 is a side cross-sectional view taken along line 4-4 in FIG. 3, showing details of the exhaust conduits of the exhaust system.

As shown by directional arrows G in FIGS. 3 and 4, exhaust gases G are expelled from the engine 22 into the exhaust manifolds 36, 38. Each exhaust manifold 36, 38 combines the incoming exhaust gases G into a stream, and directs the stream into the lower riser section 52 of the respective riser conduit 44, 46. The exhaust gases G turn upwardly within the lower riser sections 52 and are directed through the catalytic converter assemblies 56, which reduce toxic pollutants in the exhaust gases G. Upon exiting the upper ends of the catalytic converter assemblies 56, the streams of exhaust gases G are directed through the upper riser sections 58 and then into the Y-pipe 48, which combines the two streams of exhaust gases G into a single stream. The unified stream of exhaust gases G is then directed through the outlet leg 66 of the Y-pipe 48 and into the exhaust outlet conduit 50, which directs the exhaust gases G through an exhaust system outlet 70.

The physical configuration of the exhaust outlet conduit 50 as shown in FIG. 2 is merely exemplary. The exhaust outlet conduit 50 may extend for any desired length and with any configuration suitable for directing the exhaust gases G to an external environment. For example, an outlet end of the exhaust outlet conduit 50 may extend externally through a transom or a side of the hull of the motorboat 24, and may include an exhaust tip (not shown) of various types known in the art, for example.

The outer surfaces of the exhaust system 20 are maintained at safe operating temperatures, for example below 200° F., via liquid cooling. More specifically, the exhaust system 20 includes internal cooling passages (referred to collectively as a cooling "jacket"), described below, that circulate cooling liquid L through the components of the exhaust system 20 during operation. In exemplary embodiments, the cooling liquid L may be in the form of water, such as "raw" water drawn from the body of water (e.g., lake or ocean) in which the motorboat 24 is operating. Those skilled in the art will appreciate that the cooling liquid L may take various other forms, such as a synthetic coolant mixture, for example.

Referring to FIG. 3, additional features of the second exhaust manifold 38 and the second riser conduit 46 are shown. While not shown or described in detail, it will be understood that the first exhaust manifold 36 and the first riser conduit 44 are formed with similar structural features.

As shown in FIG. 3, the lower riser section 52 includes an inner tube 74 and an outer tube 76 surrounding and spaced radially outward from the inner tube 74. Likewise, the upper riser section 58 includes an inner tube 78 and an outer tube 80 surrounding and spaced radially outward from the inner tube 78. Similarly, the catalytic converter assembly 56 includes an inner can 82 that houses a catalyst element 84, and an outer can 86 surrounding and spaced radially outward from the inner can 82. The catalytic converter assembly 56 also includes inlet and outlet cone portions 90, 92 that taper from an intermediate portion 94 having an enlarged diameter for accommodating the catalyst element 84. The catalyst element 84 removes toxic pollutants from the exhaust gases G, as described above.

The inner and outer tubes 74, 76 of the lower riser section 52, the inner and outer cans 82, 86 of the catalytic converter assembly 56, and the inner and outer tubes 78, 80 of the upper riser section 58 collectively define a riser cooling passage 96, and may be arranged concentrically. As shown in FIGS. 2 and 3, the riser cooling passages 96 communicate with manifold cooling passage 98 (shown in exhaust manifold 38 in FIG. 3) via a cooling hose 100. As best shown in FIG. 2, each cooling hose 100 is coupled at an inlet end to a manifold fitting 102 arranged on an outlet end portion of the respective exhaust manifold 36, 38 (see, e.g., exhaust manifold 38 in FIG. 2) and coupled at an outlet end to a riser fitting 104 arranged on an inlet end portion on the lower riser section 52 of the respective riser conduit 44, 46 (see, e.g., riser conduit 44 in FIG. 2).

As shown by directional arrows L in FIGS. 2 and 3, cooling liquid L is directed into the cooling inlets 72 from an external source (not shown) and flows through the manifold cooling passages 98 in a direction parallel to a flow of the exhaust gases G, without contacting the exhaust gases G. The cooling liquid L then flows through the cooling hoses 100 and into the riser cooling passages 96 of the riser conduits 44, 46. In each riser cooling passage 96, the cooling liquid L flows through the lower riser section 52, upwardly through the catalytic converter assembly 56, and into the upper riser section 58. While in the riser cooling passage 96, the cooling liquid L flows parallel to the exhaust gases G but is separated from the exhaust gases G by the inner tubes 74, 78 and the inner can 82. The cooling liquid L then enters the Y-pipe 48 where it is combined with the exhaust gases G, as indicated by overlapping arrows G, L in FIG. 2. The combined flows of exhaust gases G and cooling liquid L pass downwardly through the outlet leg 66 of the Y-pipe 48 and into the outlet conduit 50, to be ejected together through the exhaust system outlet 70.

As shown in FIG. 3, the lower riser section 52 curves upwardly from an inlet end portion that is oriented generally horizontally, toward an outlet end portion that is oriented generally vertically. The catalytic converter assembly 56 then extends from the outlet end of the lower riser section 52 in a generally vertical orientation. For example, in exemplary embodiments the catalytic converter assembly 56 may extend along an axis that is approximately 15 degrees or less from perfect vertical. In this regard, the catalytic converter assembly 56 may be angled toward the respective exhaust manifold 36, 38, for example. This generally vertical orientation of the catalytic converter assembly 56 facilitates draining of cooling liquid L from the riser cooling passages 96, through drainage ports (not shown) provided on the exhaust manifolds 36, 38, when the engine 22 is turned off. In such case, residual cooling liquid L in the riser cooling passages 96 drains downwardly, in a direction opposite of the arrows L shown in FIGS. 2 and 3.

With continued reference to FIGS. 2 and 3, the exhaust system 20 may further include a pair of skin temperature sensors 106 that communicate with an onboard computer 108 for monitoring surface temperatures of the riser conduits 44, 46. Each riser conduit 44, 46 may include a boss 110 that supports the respective temperature sensor 106 in contacting relation with an outer surface of the riser conduit 44, 46. As shown, each boss 110 may be arranged on the outer tube 76 of the lower riser section 52 of the respective riser conduit 44, 46. More specifically, the boss 110 may be arranged on a bow-facing side of the lower riser section 52 at a location adjacent to the outlet end of the lower riser section 52, which extends generally vertically with the catalytic converter assembly 56. In one embodiment, the boss 110 may be arranged approximately two inches or less from the inlet cone portion 90 of the catalytic converter assembly 56. Each boss 110 may be formed with a threaded bore that threadedly engages a distal end 112 of the temperature sensor 106 so that the distal end 112 is held in contact with the outer surface of the outer tube 76 of the lower riser section 52.

Those skilled in the art will appreciate that the lower riser section 52 is generally hotter than downstream components of the riser conduit 44, 46, such as the upper riser section 58, due to being located in closer proximity to the exhaust manifold 36, 38. Accordingly, a surface temperature reading taken at a location along the lower riser section 52 is generally representative of one of the hottest surface temperatures exhibited by the riser conduit 44, 46 during operation of the engine 22. Nevertheless, in alternative embodiments the bosses 110 and temperature sensors 106 may be mounted to the riser conduits 44, 46 at various other locations along the length of the riser conduits 44, 46, including at downstream locations such as the on the upper riser sections 58, for example. Additionally, various alternative quantities of temperature sensors 106 may be used as desired.

Each temperature sensor 106 detects a surface temperature of its respective riser conduit 44, 46, and sends a signal to the computer 108 containing information regarding the detected temperature. Communication between the temperature sensors 106 and the computer 108 may be performed via wires directly connecting the temperature sensors 106 to the computer 108, or alternatively via a wireless network, for example. In response to receiving the signals from the temperature sensors 106, the computer 108 determines whether each riser conduit 44, 46 is receiving an adequate flow of cooling liquid L through its riser cooling passage 96. More specifically, the computer 108 may compare each of the detected temperatures to one or more pre-determined threshold temperatures, and then take additional pre-determined action as appropriate.

In an exemplary embodiment, the computer 108 may determine whether each of the detected temperatures is less than or equal to a base threshold temperature of approximately 160° F. If the detected temperatures satisfy this condition, the computer 108 may conclude that the riser conduits 44, 46 are receiving an adequate flow of cooling liquid L. If the detected temperatures do not satisfy this condition, the computer 108 may take further action. More specifically, if one of or both the detected temperatures is between the base threshold temperature and an elevated threshold temperature, such as 190° F. for example, the computer 108 may log a warning condition and provide a warning message to the user, for example by illuminating one or more indicator lights (not shown) or by displaying a message on a digital display (not shown). If one of or both the detected temperatures is greater than the elevated threshold temperature, the computer 108 may instruct an engine control module (not shown) to decrease rpms of the engine 22 by a predetermined amount, or, according to a programmed algorithm, for example. In this manner, the outer surface temperatures of the exhaust system 20 may be maintained within desirable ranges.

Figure 5:
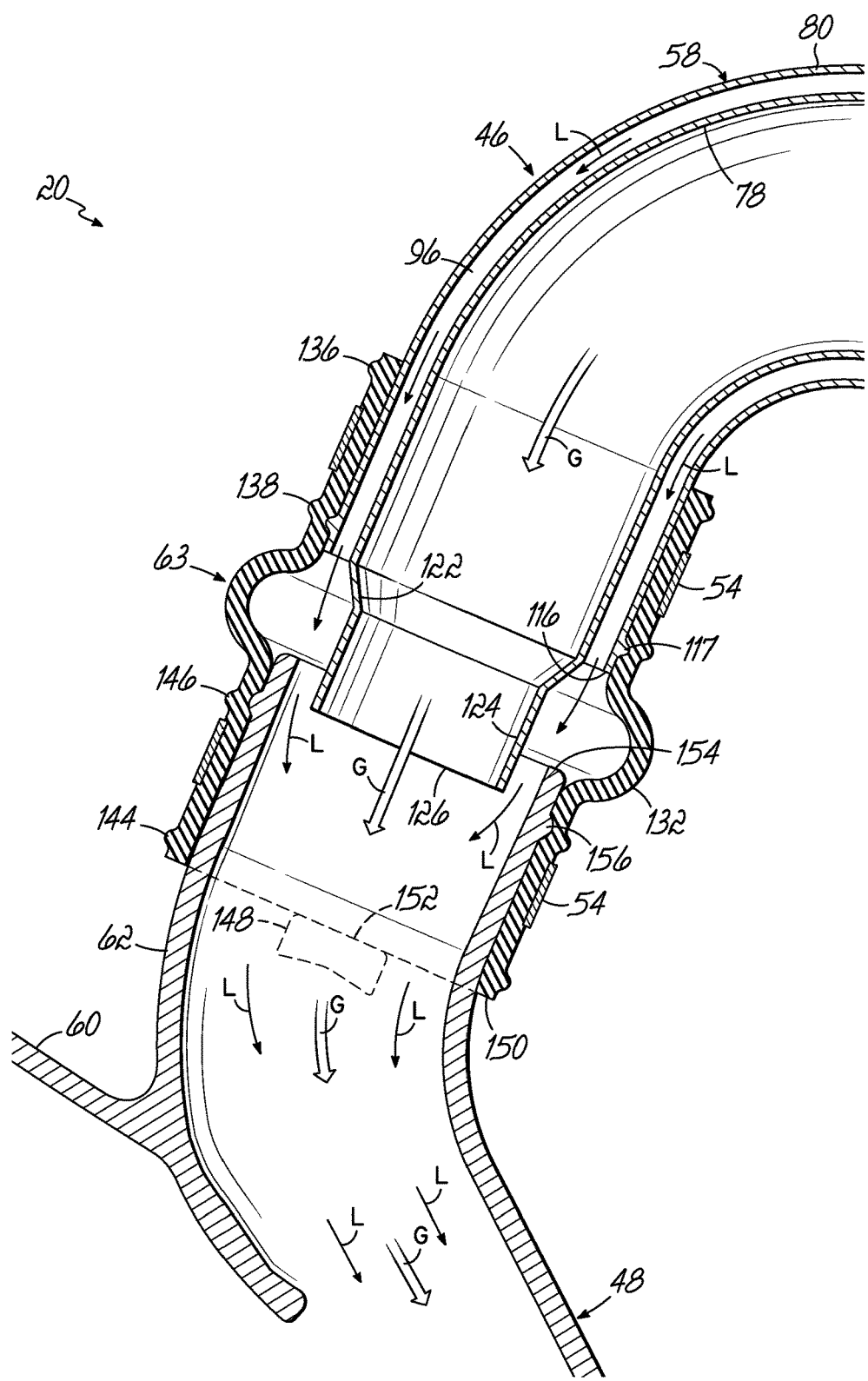
FIG. 5 is an enlarged view of an outlet end portion of one of the exhaust conduits, an inlet end portion of a branch of the Y-pipe of the exhaust system and a bellows of FIG. 4.
Figure 6:
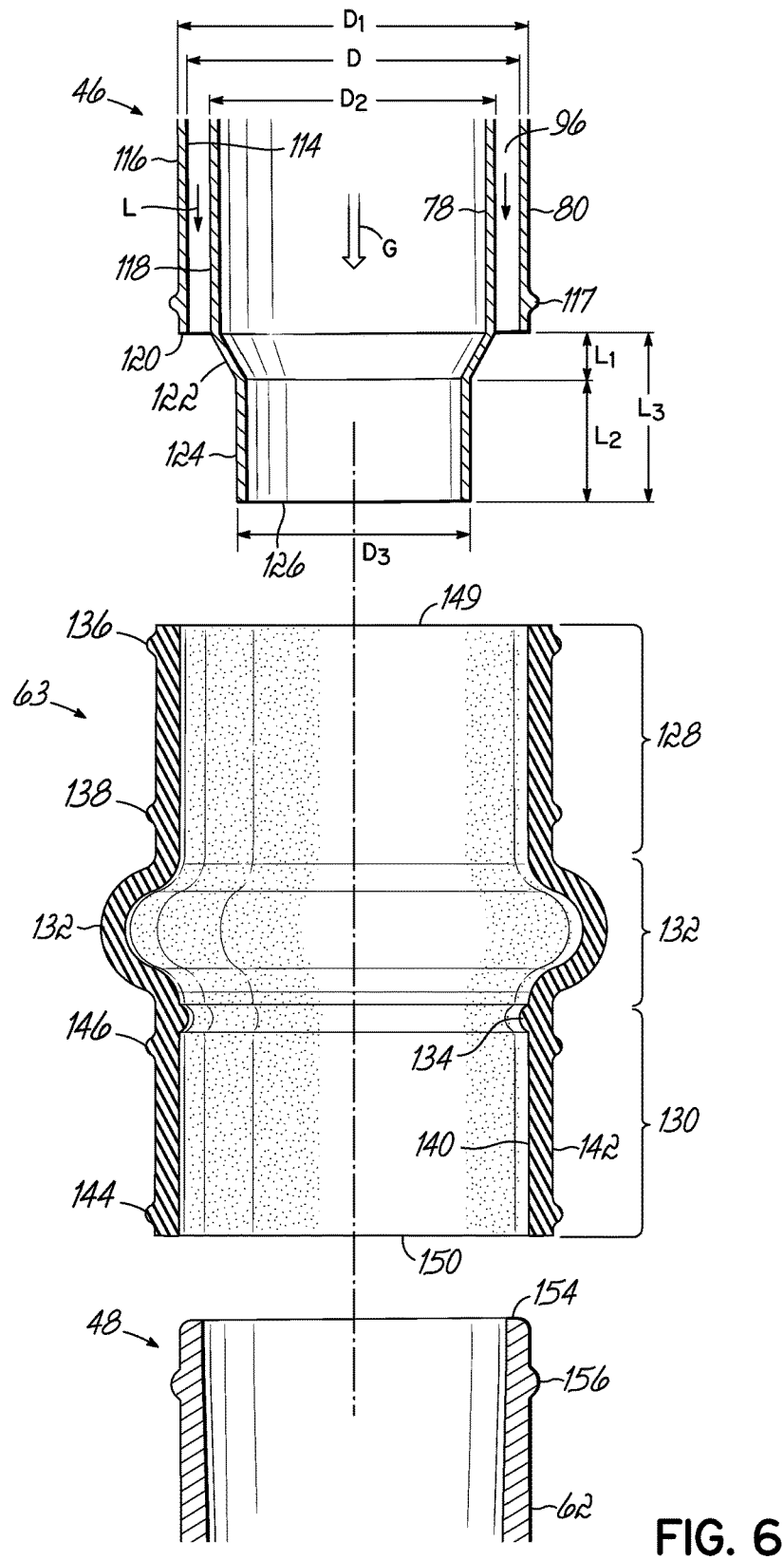
FIG. 6 is a disassembled cross-sectional view the outlet end portion of the exhaust conduit of FIG. 5, the inlet end portion of a branch of the Y-pipe of the exhaust system and the bellows of FIG. 5.
Figure 7:
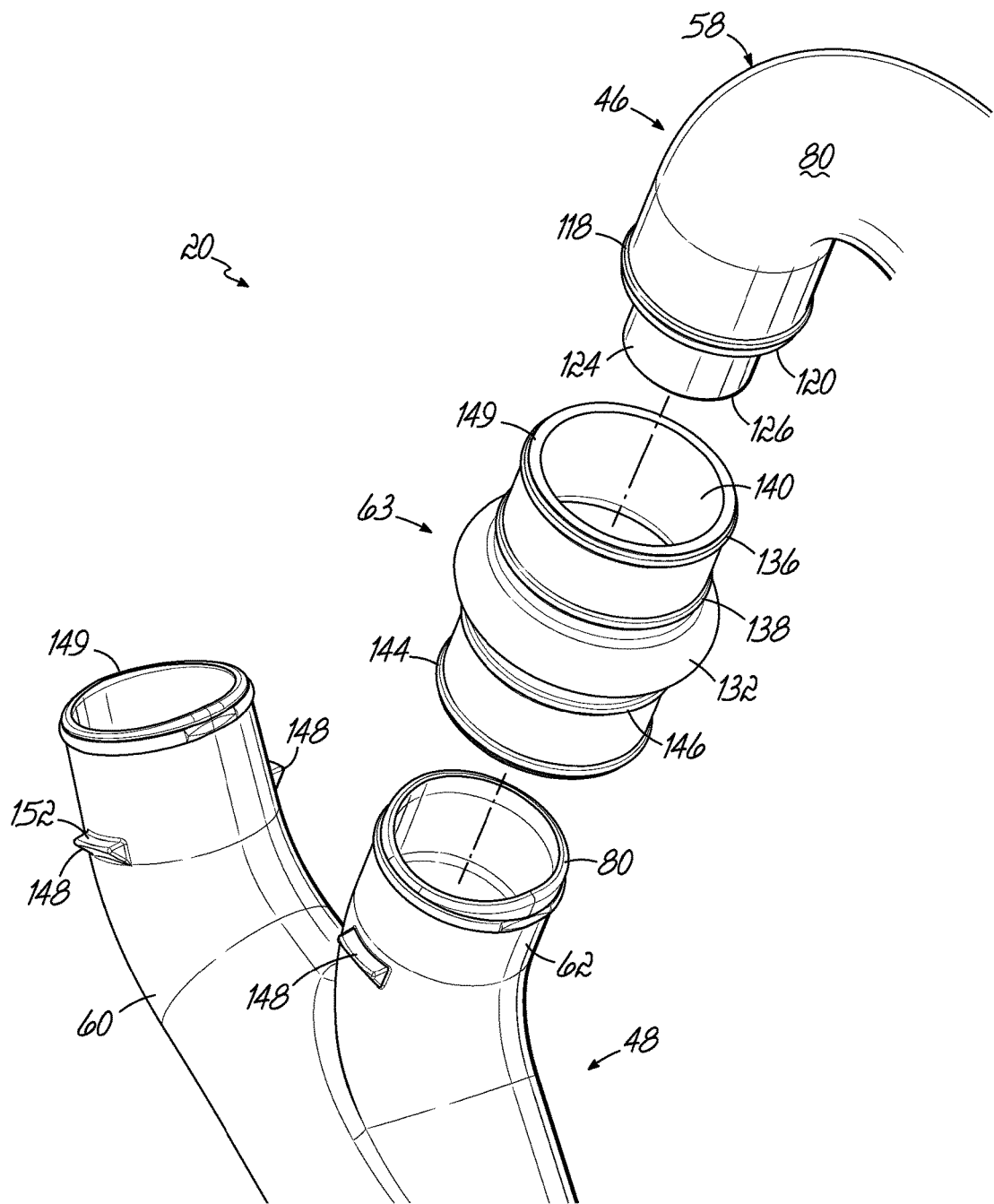
FIG. 7 is a perspective disassembled view of a portion of the marine engine exhaust system showing an outlet end portion of one of the exhaust conduits.

Referring to FIGS. 4-7, additional details of the outlet end portion of the upper riser section 58 of each riser conduit 44, 46 are shown. As best shown in FIGS. 5-7, the inner tube 78 of the upper riser section 58 is longer than outer tube 80 of the upper riser section 58 within each riser conduit 44, 46.

As best shown in FIG. 6, the outer tube 80 of the upper riser section 58 within each riser conduit 44, 46, respectively, has a generally uniform inner diameter D. The outer tube 80 of the upper riser section 58 within each riser conduit 44, 46, respectively, has a uniform smooth inner surface 114 and a non-uniform outer surface 116. As best shown in FIG. 6, an annular rim 117 extends radially outward from the outer surface 116 of the outer tube 80 of the upper riser section 58 within each riser conduit 44, 46, respectively. The annular rim 117 functions to help keep the bellows 63 in its desired location by compressing the material of the bellows 63, usually rubber, to prevent the upper clamp 54 from moving downwardly when the exhaust system 20 is fully assembled, as shown in FIG. 5. The outer tube 80 of the upper riser section 58 within each riser conduit 44, 46, respectively, has an outer edge 120.

As best shown in FIG. 6, the inner tube 78 of the upper riser section 58 within each riser conduit 44, 46, respectively, is a unitary member having a main section 118 of a uniform smooth outer diameter D2. As best shown in FIG. 6, a cone section 122 extends radially inward from the main section 118 of the inner tube 78 of the upper riser section 58 within each riser conduit 44, 46, respectively. An end section 124 of a uniform outer diameter D3 extends downward from the cone section 122 of the inner tube 78 of the upper riser section 58 within each riser conduit 44, 46, respectively. The inner tube 78 of the upper riser section 58 within each riser conduit 44, 46, respectively, has an outer edge 126. The uniform outer diameter D2 of the main section 118 of the inner tube 78 of the upper riser section 58 within each riser conduit 44, 46, respectively, is greater than the uniform outer diameter D3 of the end section 124 of the inner tube 78 of the upper riser section 58 within each riser conduit 44, 46, respectively. The outer diameter of the cone section 122 linearly decreases in the downstream direction from the uniform outer diameter D2 of the main section 118 of the inner tube 78 to the uniform outer diameter D3 of the end section 124 of the inner tube 78 of the upper riser section 58 within each riser conduit 44, 46, respectively. The same is true of the smooth inner diameters of the main section 118, cone section 122 and end section 124 of the inner tube 78 of the upper riser section 58 within each riser conduit 44, 46, respectively, although these inner diameters are not specifically labeled in the drawings.

As best shown in FIG. 6, the length $L_2$ of the end section 124 is greater than the length $L_1$ of the cone section 122 of the inner tube 78 of the upper riser section 58 within each riser conduit 44, 46, respectively. The combination of the cone and end sections 122, 124 comprises an extension 125 of inner tube 78 beyond the outer edge 120 of the outer tube 80 within each riser conduit 44, 46, respectively. As best shown in FIG. 6, the outer edge 126 of the inner tube 78 is downstream a distance $L_3$ (the sum of the lengths $L_2$ and $L_1$ of the end and cone sections 124, 122, respectively) from the outer edge 120 of the outer tube 80 within each riser conduit 44, 46, respectively.

As best shown in FIGS. 5 and 6, each bellows 63 comprises an upstream portion 128, a downstream portion 130 and a middle portion 132 therebetween. Each bellows 63 has an upper edge 149 and a lower edge 150. The upstream and downstream portions 128, 130, respectively, of bellows 63 are illustrated being substantially identical. However, the downstream portion 130 of bellows 63 has an inner lip 134 extending radially inwardly from an inner surface 140 of the downstream portion 130. As best shown in FIG. 6, the upstream portion 128 of bellows 63 has outer and inner annular ridges 136, 138, respectively, extending outwardly from an outer surface 142 of the bellows 63 to assist in holding one of the clamps 54 therebetween, as shown in FIG. 5. Similarly, the downstream portion 130 of bellows 63 has outer and inner annular ridges 144, 146, respectively, extending outwardly from the outer surface 142 of the bellows 63 to assist in holding a second or downstream clamp 54 therebetween, as shown in FIG. 5. The middle portion 132 of bellows 63 is curved or bowed outwardly, as best shown in FIG. 6.

As best shown in FIG. 7, each of the first and second inlet legs 60, 62 of the Y-pipe 48 has two stops 148 extending outwardly therefrom. Each pair of stops 148 located on opposed sides of each of the first and second inlet legs 60, 62 of the Y-pipe 48 functions to locate one of the bellows 63 in a proper location by stopping downward movement of the bellows 63. As best shown in FIG. 5, once the lower edge 150 of the bellows 63 abuts upper planar surfaces 152 of the pair of stops 148, the bellows 63 is in its correct location and the lower clamp 54 may secure the downstream portion 130 of bellows 63 around one of the first and second inlet legs 60, 62 of the Y-pipe 48.

As best shown in FIG. 6, each of the first and second inlet legs 60, 62 of the Y-pipe 48 has an upper edge 154 and an annular ridge 156 extending outwardly from an outer surface of the inlet leg. FIG. 6 illustrates only second inlet leg 62 but those skilled in the art will appreciate that first inlet leg 60 is similarly formed. The annular ridge 156 pushes inwardly on the material of the downstream portion 130 of bellows 63 to help secure the bellows 63 in its desired location and prevent movement of the bellows 63. See FIG. 5.

As best shown in FIG. 5, once fully assembled, the upstream portion 128 of bellows 38 surrounds and contacts the outer tube 80 of the upper riser section 58 within each riser conduit 44, 46, respectively (only riser conduit 46 being shown in FIG. 5). The cone section 122 and a portion of the end section 124 of the inner tube 78 of the upper riser section 58 within each riser conduit 44, 46, respectively, is located inside the middle portion 132 of bellows 63. The rest of the end section 124 of the inner tube 78 of the upper riser section 58 within each riser conduit 44, 46, respectively, is spaced inside one of the first and second inlet legs 60, 62 of the Y-pipe 48. FIG. 5 illustrates only second inlet leg 62 of the Y-pipe 48.

To minimize and hopefully eliminate reversion discussed above, the novel end section 124 of each of the inner tubes 78 of each of the upper riser sections 58 within each riser conduit 44, 46, respectively, extends inside one of the first and second inlet legs 60, 62 of the Y-pipe 48, thus keeping the exhaust gas G separated from the cooling liquid L flowing through the riser cooling passage 96 longer than prior art exhaust systems. In other words, the exhaust gas G combines with the cooling liquid L further downstream than prior art exhaust systems, thereby reducing the possibility of reversion. As shown in FIG. 5, upon assembly, the upper edges 154 of the first and second inlet legs 60, 62 of the Y-pipe 48 are upstream from the outer edges 126 of the upper riser sections 58 within riser conduits 44, 46. This is shown in FIG. 5 with respect to riser conduit 46 only but may be the same in riser conduit 44.

In exemplary embodiments, structural integrity of the exhaust system 20 may be further enhanced by constructing the riser conduits 44, 46 from 316L stainless steel, which exhibits enhanced corrosion resistance compared to other conventional grades of steel commonly used in marine applications. It will be appreciated that such construction may be applied to any of the exemplary embodiments disclosed herein.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. An exhaust system for a marine engine, the exhaust system comprising:
   first and second exhaust manifolds;
   first and second riser conduits, the first riser conduit being coupled to the first exhaust manifold and the second riser conduit being coupled to the second exhaust manifold,
   a Y-pipe having first and second inlet legs and an outlet leg;
   each of the first and second riser conduits comprising an inner tube that directs exhaust gases from one of the first and second exhaust manifolds through a catalytic converter assembly and into one of the first and second inlet legs of the Y-pipe,
   each of the first and second riser conduits further comprising an outer tube surrounding the inner tube defining a cooling liquid passage between the inner and outer tubes,
   first and second bellows, each of the bellows surrounding a portion of one of the first and second inlet legs of the Y-pipe and the outer tube of one of the riser conduits, the bellows coupling one of the first and second riser conduits to one of the first and second inlet legs of the Y-pipe using clamps surrounding the bellows,
   wherein the inner tube of each of the first and second riser conduits has an extension comprising a cone section and an end section downstream of the cone section, the extension extending beyond an outer edge of the outer tube and into one of the bellows further than the outer tube of the respective riser conduit.

2. The exhaust system of claim 1, wherein the inner tube of each of the first and second riser conduits has a main section upstream of the cone section.

3. The exhaust system of claim 2, wherein the main section of the inner tube of each of the first and second riser conduits has a diameter greater than the diameter of the end section.

4. The exhaust system of claim 1, wherein the inner tube of each of the first and second riser conduits is a unitary member.

5. The exhaust system of claim 1, wherein only the inner tube of each of the first and second riser conduits extends at partially inside one of the first and second inlet legs of the Y-pipe.

6. An exhaust system for a marine engine, the exhaust system comprising:
   first and second exhaust manifolds;
   first and second riser conduits, the first riser conduit being coupled to the first exhaust manifold and the second riser conduit being coupled to the second exhaust manifold,
   a Y-pipe having first and second inlet legs and an outlet leg;
   each of the first and second riser conduits comprising an inner tube that directs exhaust gases from one of the first and second exhaust manifolds through a catalytic converter assembly and into one of the first and second inlet legs of the Y-pipe,
   each of the first and second riser conduits further comprising an outer tube surrounding the inner tube defining a cooling liquid passage between the inner and outer tubes,
   first and second bellows, each of the bellows surrounding a portion of one of the first and second inlet legs of the Y-pipe and the outer tube of one of the riser conduits, the bellows coupling one of the first and second riser conduits to one of the first and second inlet legs of the Y-pipe using clamps surrounding the bellows,
   wherein the inner tube of each of the first and second riser conduits has an extension comprising a cone section and an end section downstream of the cone section, the extension extending beyond an outer edge of the outer tube and into one of the bellows further than the outer tube of the respective riser conduit and wherein each of the first and second bellows has a middle portion bowed outwardly and only the inner tube of one of the first and second riser conduits extends axially beyond the middle portion of the bellows.

7. An exhaust system for a marine engine, the exhaust system comprising:
   first and second exhaust manifolds;
   a Y-pipe having first and second inlet legs and an outlet leg;
   a first riser conduit coupled to the first exhaust manifold and extending into the first inlet leg of the Y-pipe;
   a second riser conduit coupled to the second exhaust manifold and extending into the second inlet leg of the Y-pipe;
   each of the first and second riser conduits comprising an inner tube and an outer tube surrounding the inner tube defining a cooling liquid passage between the inner and outer tubes, the inner tube having an extension comprising a cone section and an end section downstream of the cone section, the extension extending beyond an outer edge of the outer tube and directing exhaust gases from one of the first and second exhaust manifolds through a catalytic converter assembly and into one of the first and second inlet legs of the Y-pipe,
   first and second bellows, each of the bellows coupling one of the first and second riser conduits to one of the first and second inlet legs of the Y-pipe and surrounding a portion of one of the first and second inlet legs of the Y-pipe and surrounding the outer tube of one of the riser conduits;

at least one clamp surrounding each of the bellows, wherein the inner tube of each of the first and second riser conduits extends into one of the bellows further than the outer tube of the respective riser conduit.

8. The exhaust system of claim 7, wherein the inner tube of each of the first and second riser conduits has a main section upstream of the cone section.

9. The exhaust system of claim 8, wherein the main section of the inner tube of each of the first and second riser conduits has a diameter greater than the diameter of the end section.

10. The exhaust system of claim 7, wherein the inner tube of each of the first and second riser conduits is a unitary member.

11. The exhaust system of claim 7, wherein only the inner tube of each of the first and second riser conduits extends at partially inside one of the first and second inlet legs of the Y-pipe.

12. An exhaust system for a marine engine, the exhaust system comprising:
  first and second exhaust manifolds;
  a Y-pipe having first and second inlet legs and an outlet leg;
  a first riser conduit coupled to the first exhaust manifold and extending into the first inlet leg of the Y-pipe;
  a second riser conduit coupled to the second exhaust manifold and extending into the second inlet leg of the Y-pipe;
  each of the first and second riser conduits comprising an inner tube and an outer tube surrounding the inner tube defining a cooling liquid passage between the inner and outer tubes, the inner tube directing exhaust gases from one of the first and second exhaust manifolds through a catalytic converter assembly and into one of the first and second inlet legs of the Y-pipe,
  first and second bellows, each of the bellows coupling one of the first and second riser conduits to one of the first and second inlet legs of the Y-pipe and surrounding a portion of one of the first and second inlet legs of the Y-pipe and surrounding the outer tube of one of the riser conduits;
  at least one clamp surrounding each of the bellows, wherein the inner tube of each of the first and second riser conduits has an extension comprising a cone section and an end section downstream of the cone section, the extension extending beyond an outer edge of the outer tube and into one of the bellows further than the outer tube of the respective riser conduit, wherein each of the first and second bellows has a middle portion bowed outwardly and only the inner tube of one of the first and second riser conduits extends axially beyond the middle portion of the bellows.

13. An exhaust system for a marine engine, the exhaust system comprising:
  first and second riser conduits;
  a Y-pipe having first and second inlet legs and an outlet leg;
  each of the first and second riser conduits comprising an inner tube and an outer tube surrounding the inner tube defining a cooling liquid passage between the inner and outer tubes, the inner tube directing exhaust gases from one of the first and second exhaust manifolds through a catalytic converter assembly and into one of the first and second inlet legs of the Y-pipe, the outer tube directing cooling liquid into one of the first and second inlet legs of the Y-pipe;
  first and second bellows, each of the bellows coupling one of the first and second riser conduits to one of the first and second inlet legs of the Y-pipe and surrounding a portion of one of the first and second inlet legs of the Y-pipe and surrounding the outer tube of one of the riser conduits;
  at least one clamp surrounding each of the bellows, wherein the inner tube of each of the first and second riser conduits extends into one of the bellows further than the outer tube of the respective riser conduit, wherein the inner tube of each of the first and second riser conduits is a unitary member having an extension comprising a cone section and an end section downstream of the cone section, the extension extending beyond an outer edge of the outer tube.

14. The exhaust system of claim 13, wherein the inner tube of each of the first and second riser conduits has a main section upstream of the cone section.

15. The exhaust system of claim 14, wherein the main section of the inner tube of each of the first and second riser conduits has a diameter greater than the diameter of the end section.

16. The exhaust system of claim 13, wherein only the inner tube of each of the first and second riser conduits extends at partially inside one of the first and second inlet legs of the Y-pipe.

17. The exhaust system of claim 13, wherein each of the first and second bellows has a middle portion bowed outwardly and only the inner tube of one of the first and second riser conduits extends axially beyond the middle portion of the bellows.

18. The exhaust conduit of claim 13, wherein the inner tube and the outer tube are formed of 316L stainless steel.

* * * * *

UNITED STATES PATENT AND TRADEMARK OFFICE
CERTIFICATE OF CORRECTION

PATENT NO. : 10,464,652 B2
APPLICATION NO. : 15/877909
DATED : November 5, 2019
INVENTOR(S) : Timothy G. Anderson et al.

It is certified that error appears in the above-identified patent and that said Letters Patent is hereby corrected as shown below:

On the Title Page

Column 2
Beside "Assistant Examiner", "Anthony Ayala Delgago" should be ---Anthony Ayala Delgado---.

In the Specification

Column 1
Line 6, "engines, and more" should be ---engines and, more---.

Column 2
Line 32, "comprise" should be ---comprises---.

Column 3
Line 32, "view the outlet" should be ---view of the outlet---.

Column 6
Line 36, "such as the on" should be ---such as on---.

In the Claims

Column 10
Line 5, In Claim 5, insert the word --least-- after the words "extends at".

Column 11
Line 16, In Claim 11, insert the word --least-- after the words "extends at".

Column 12
Line 42, In Claim 16, insert the word --least-- after the words "extends at".

Signed and Sealed this
Eighteenth Day of February, 2020

Andrei Iancu
*Director of the United States Patent and Trademark Office*